(12) United States Patent
Harima

(10) Patent No.: US 11,052,805 B2
(45) Date of Patent: Jul. 6, 2021

(54) CONSOLE BIN ASSEMBLY FOR A VEHICLE

(71) Applicant: Toyota Motor Engineering & Manufacturing North America, Inc., Plano, TX (US)

(72) Inventor: Kazunori Harima, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 77 days.

(21) Appl. No.: 16/556,535

(22) Filed: Aug. 30, 2019

(65) Prior Publication Data

US 2021/0061153 A1 Mar. 4, 2021

(51) Int. Cl.
*B60N 3/00* (2006.01)
*B60N 3/10* (2006.01)

(52) U.S. Cl.
CPC .................................. *B60N 3/101* (2013.01)

(58) Field of Classification Search
CPC .. B60N 3/01; B60R 7/04; B60R 7/046; B60R 7/06; B60R 2011/0005; B60R 2011/0007

USPC .............................................. 296/24.34, 37.8
See application file for complete search history.

(56) References Cited

U.S. PATENT DOCUMENTS

| 5,636,890 A | 6/1997 | Cooper |
| 10,081,313 B1 | 9/2018 | Ross |
| 10,106,105 B2 | 10/2018 | Hansen et al. |
| 2010/0288659 A1* | 11/2010 | Dang ...................... A47K 1/09 206/277 |

FOREIGN PATENT DOCUMENTS

| CA | 2637780 C | 1/2015 |
| JP | 5464021 B2 | 4/2014 |
| KR | 19980031380 A | 7/1998 |

* cited by examiner

*Primary Examiner* — Dennis H Pedder
(74) *Attorney, Agent, or Firm* — Christopher G. Darrow; Darrow Mustafa PC

(57) ABSTRACT

A console bin assembly for a vehicle includes a bin surface having a perimeter and a wall extending upward relative to the bin surface. A channel having a first end and a second end is located adjacent to the perimeter of the bin surface and the first wall. A drainage hole located near the first end of the channel. The channel is sloped such that the channel guides liquid entering the channel to the drainage hole.

9 Claims, 4 Drawing Sheets

CONSOLE BIN ASSEMBLY FOR A VEHICLE

TECHNICAL FIELD

The subject matter described herein relates in general to console bin assemblies for vehicles and, more particularly, to console bin assemblies having drainage features.

BACKGROUND

Vehicles, such as automobiles, trucks, tractors, boats, aircraft, and the like, generally include one or more console bin assemblies for the storage of items. Some of these stored items include items that are temporarily placed in a cavity of the console bin assembly, such as portable electronic devices. These portable electronic devices could include devices such as mobile phones, tablet computers, notebook computers, portable audio devices and the like. Some portable electronic devices can be damaged when exposed to water or other liquids. Occupants of vehicles must be careful to not inadvertently place their portable electronic devices in the console bin assembly when there is standing liquid within the console bin assembly.

SUMMARY

Disclosed herein are examples of a structure for a console bin assembly. In one example, the console bin assembly includes a bin surface having a perimeter and a wall generally adjacent to the bin surface and extending upward relative to the bin service. A channel having a first end and a second end is located adjacent to the perimeter of the bin surface and the wall. A drainage hole may be located near the first end of the channel. The channel is sloped so liquid entering the channel is guided to the drainage hole.

In another example, the channel may include a second drainage hole located near the second end of the channel and an apex formed within the channel and located between the first end and a second end. A first portion of the channel located between the apex and the first end is sloped such that liquid entering the first portion of the channel is guided to the drainage hole located at the first end of the channel. A second portion of the channel located between the apex and the second end is sloped such that liquid entering the second portion of the channel is guided to the drainage hole located at the second end of the channel.

In yet another example, the console bin assembly may be located adjacent to a cup holder. The wall of the console bin assembly may also define one wall for the cup holder.

These and other aspects will be described in additional detail below.

BRIEF DESCRIPTION OF THE DRAWINGS

The various features, advantages and other uses of the present embodiments will become more apparent by referring to the following detailed description and drawings in which.

DETAILED DESCRIPTION

This disclosure teaches a structure for realizing the benefits of a vehicle having a console bin assembly that allows for the drainage of liquids from the console bin assembly via a channel near a bin surface of the console bin assembly. The bin surface of the console bin assembly is configured such that when liquids are introduced to the bin surface of the console bin assembly, the bin surface directs these liquids to the channel. From there, liquids entering the channel are then directed to one or more drainage holes allowing liquid to drain away from the channel and therefore the console bin assembly. Liquid draining into the drainage holes may then be directed to a drainage system of the cabin floor of a vehicle and eventually discharged from the vehicle.

Figure 2:
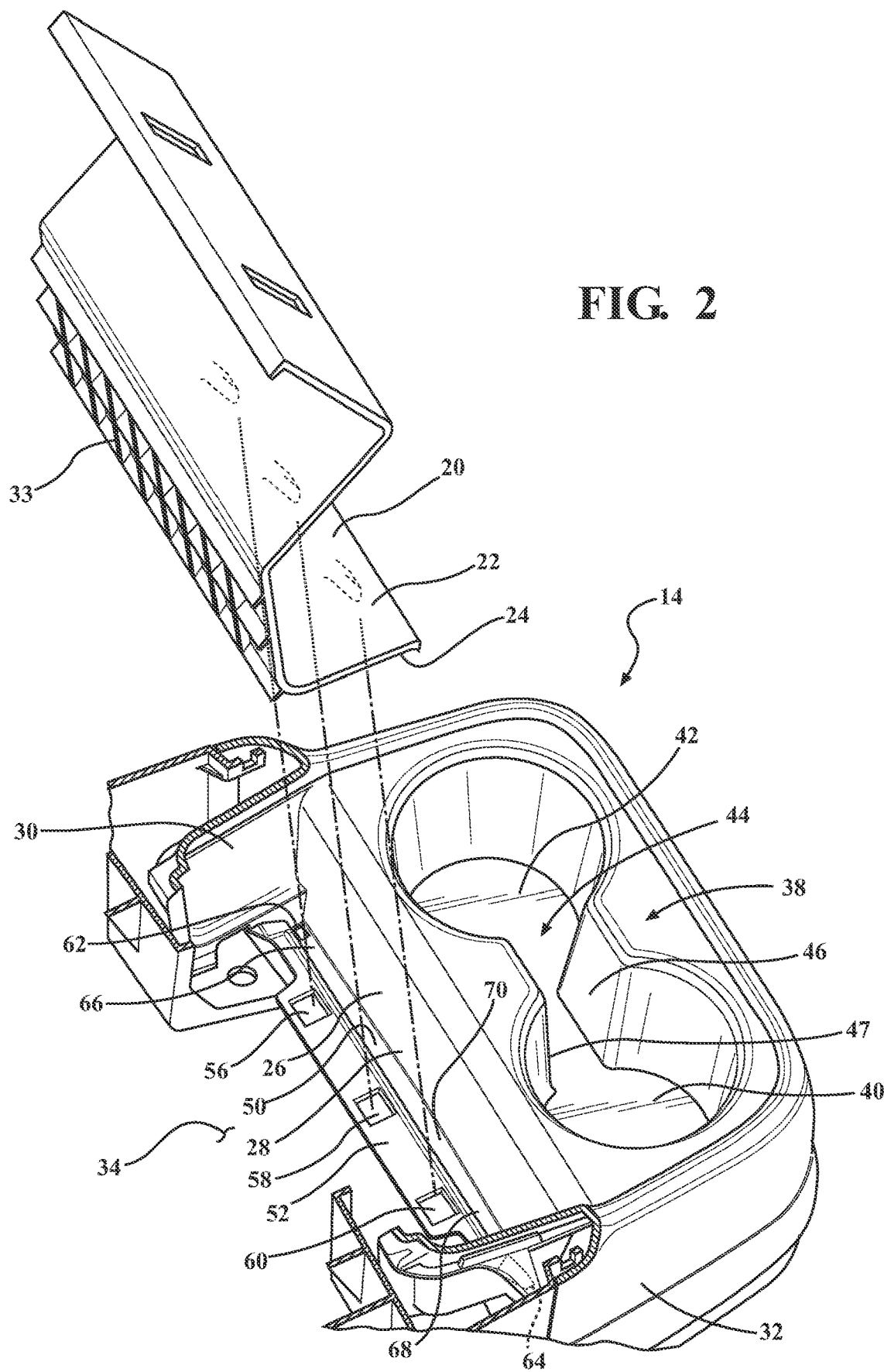
FIG. 2 illustrates a more detailed and exploded view of the console bin assembly.
Figure 3:
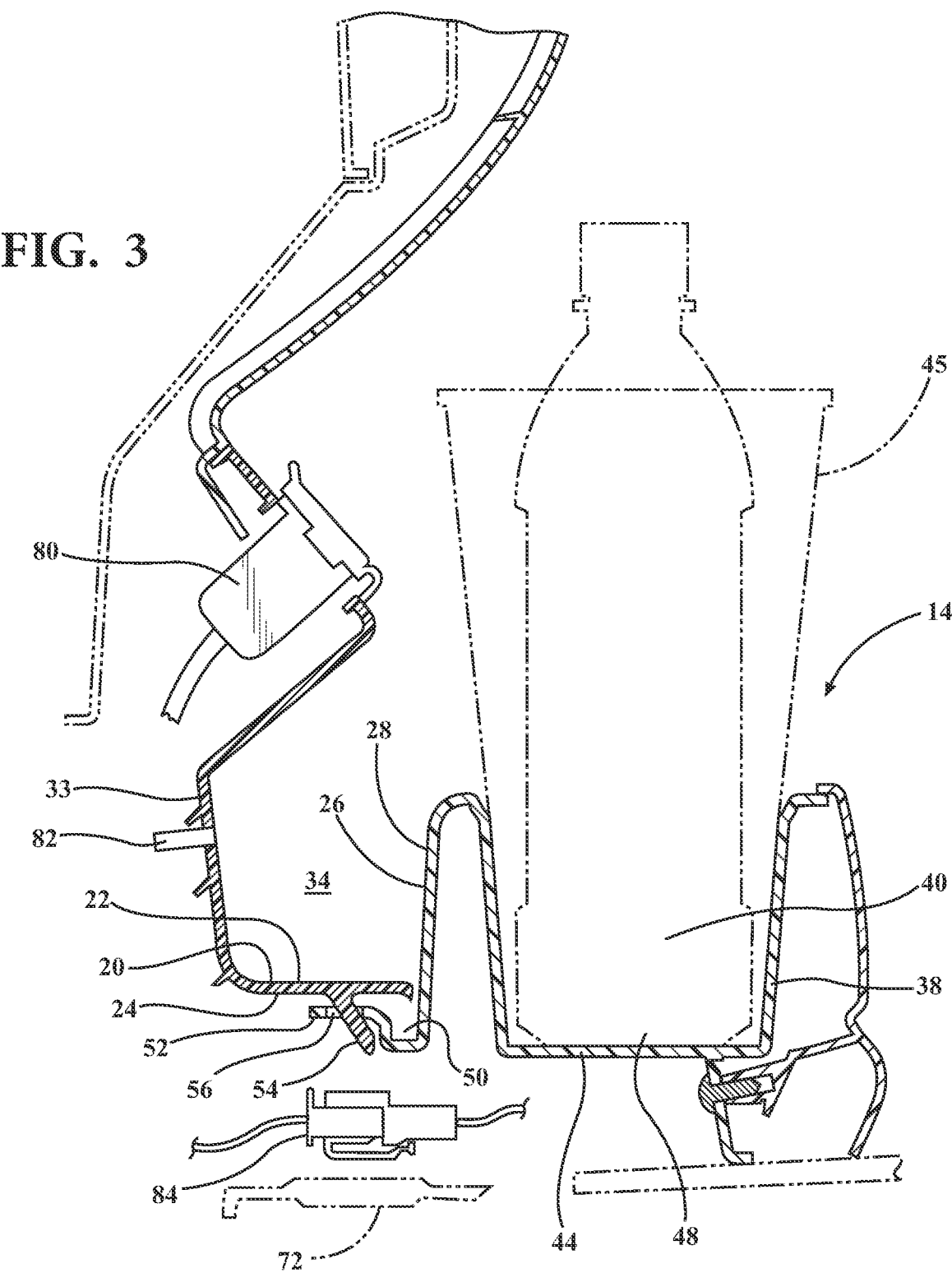
FIG. 3 illustrates a cutaway view of the console bin assembly.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
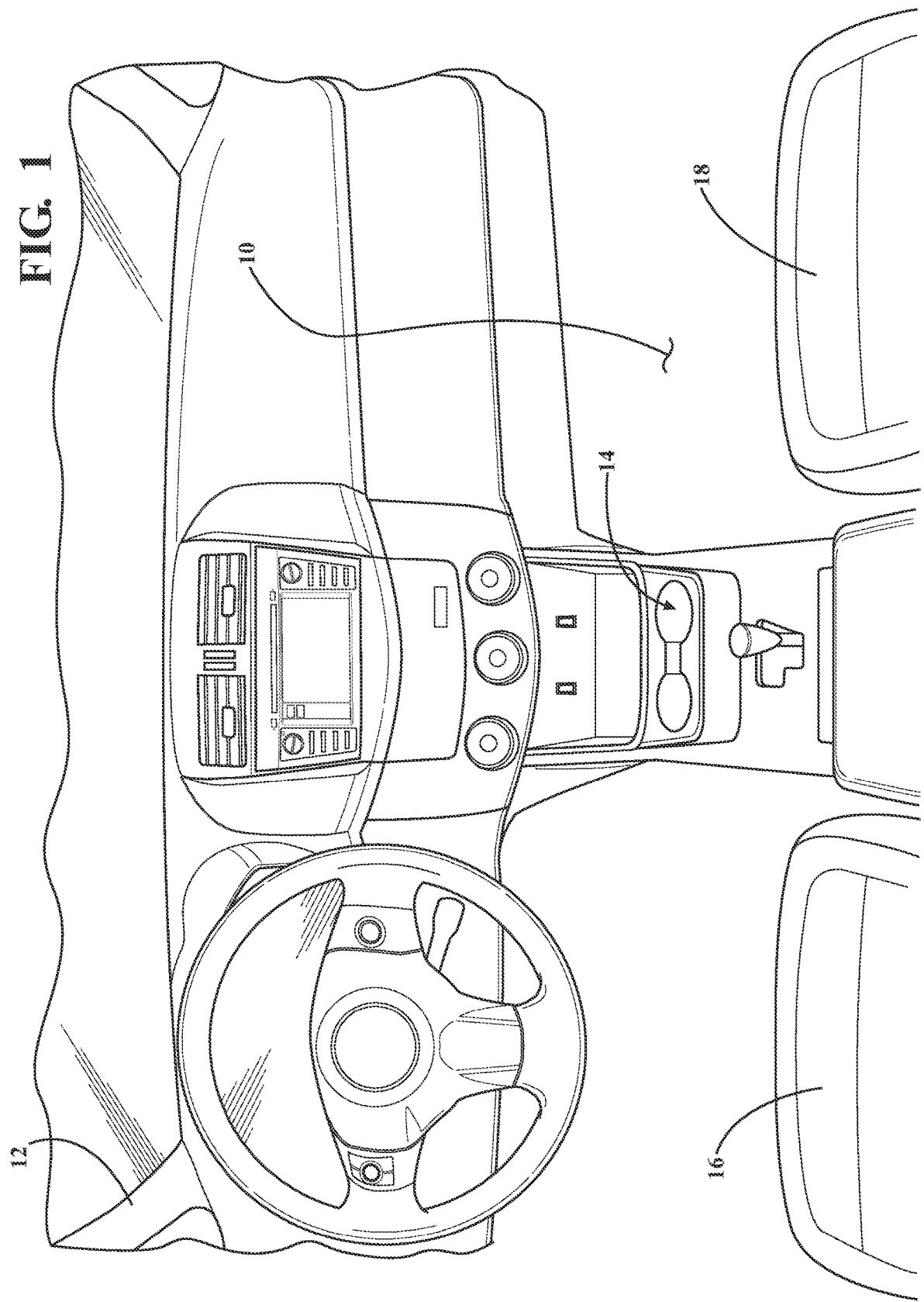
FIG. 1 illustrates the interior of the vehicle having a console bin assembly.

Referring to FIG. 1, illustrated is a cabin 10 of a vehicle 12 incorporating the console bin assembly 14. The vehicle 12 may be any type of vehicle capable of transporting persons or items from one location to another. As such, while the vehicle 12 in this example is shown to be an automobile, the vehicle 12 may take any one of several different forms. For example, the vehicle 12 may be a truck, sport utility vehicle, heavy-duty truck, tractor-trailer, farm tractor, military vehicle, aircraft, watercraft, and the like. Again, the vehicle 12 may be any type of vehicle capable of transporting persons or items from one location to another. Further, the console bin assembly 14 may be incorporated into non-vehicle based applications.

Here, the vehicle 12 includes a driver seat 16 and a passenger seat 18 located within the cabin 10 and forming the first row of seats within the cabin 10. Located generally between the driver seat 16 and the passenger seat 18 is a console bin assembly 14. While this example shows that the console bin assembly 14 is in a first row of seats between the driver seat 16 and the passenger seat 18, the console bin assembly could be located in a second row, third row or any other row of the vehicle. In addition, while the console bin assembly 14 is shown to be located between the seats 16 and 18, it should be equally understood that the console bin assembly 14 could be located anywhere within the cabin 10 of the vehicle 12 and not necessarily between seats of any row of the vehicle 12.

Figure 4:
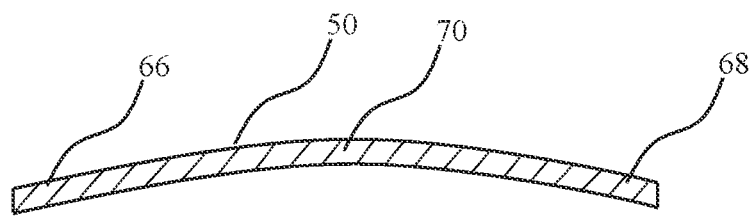
FIG. 4 illustrates a sectional view of a channel having an apex.

Referring to FIGS. 2, 3, and 4, more detailed illustrations of the console bin assembly 14 are shown. Here, the console bin assembly 14 generally includes a bin surface 20 having a top side 22 and a bottom side 24. A wall 26 generally extends in a direction that is substantially perpendicular to a plane defined by the bin surface 20 of the console bin assembly 14.

The wall 26 may be formed by several different portions or from a single portion. For example, the wall 26 may have a longer back portion 28 that defines one side of the console bin assembly 14. The wall 26 may also have transverse portions 30 and 32 that generally extend transversely from the back portion 28. A front portion 33 may extend in a direction substantially parallel to the back portion 28. When assembled, as best shown in FIG. 3, the back portion 28, transverse portions 30 and 32, and front portion 33 generally define a cavity 34 of the console bin assembly 14. The cavity 34 essentially allows one to place one or more items within it, such as portable electronic devices like mobile phones, tablets, notebook computers, and the like.

The wall portions 28, 30, 32 and 33 may be made of one unitary piece or may be made by combining separate pieces together. For example, as best shown in FIG. 2, the wall portions 28, 30 and 32 are formed of one unitary piece, while the front portion 33 along with the bin surface 20 may be formed of a second unitary piece. When mated together, these unitary pieces essentially form the cavity 34 of the console bin assembly 14.

The console bin assembly 14 may also include a cup holder portion 38 that is adjacent to the cavity 34 of the console bin assembly 14. The cup holder portion 38 may have one or more generally cylindrically shaped cavities 40 and 42 that are configured to receive one or more different types of drinking vessels 45. The cavities 40 and 42 of the cup holder portion 38 generally extend upward from a cup holder surface 44 that functions to support the bottom of the drinking vessel 45.

A cup holder channel 46 may be defined between the cavities 40 and 42 to place the cavities 40 and 42 in fluid communication with each other. The purpose of the cup holder channel 46 is to allow drinking vessels 45 with handle features or other shapes to be received more easily by the cavity 40 and/or 42. The handle of the drinking vessel 45 could extend into the cup holder channel 46 to allow a bottom 48 of the drinking vessel 45 to be flush with the surface 44 of the cup holder portion 38, thereby minimizing spills. A portion of the cup holder surface 47 within the cup holder channel 46 and between the cavities 40 and 42 may be flush with the cup holder surface 44 as shown or maybe slightly raised, to provide some separation between the cavities 40 and 42.

The back portion 28 of the wall 26 may also partially define the cup holder portion 38. The back portion 28 defines a portion of the cavities 40 and 42 and may further define the cup holder channel 46 located between the cavities 40 and 42. In one example, the back portion 28 and the cup holder surface 44 may be formed as a single unitary structure.

In order for liquid to be drained out of the cavity 34 of the console bin assembly 14, the console bin assembly 14 may include a channel 50. The channel 50 may be defined by the wall 26 and by one or more of the wall portions 28, 30, 32 and/or 33. In addition, the channel 50 may also be defined by the bin surface 20 of the console bin assembly 14.

In one example best shown in FIG. 3, the channel 50 is defined and integrated with the wall 26. The wall 26 extends downward past the bin surface 20 and forms a U-shaped channel 50. In addition to the U-shaped channel 50, the wall portion that defines the U-shaped channel 50 terminates with a lip 52 that generally extends under the bottom side 24 of the bin surface 20. While a U-shaped channel is shown, any channel shape may be utilized. Also, part of the bin surface 20 may extend over part of the channel 50. As shown, the back portion 28, the cup holder surface 44, and the channel 50 may be made of one unitary piece.

In this example, the bottom side 24 may include one or more projections 54 that extend away from the bottom side 24 of the bin surface 20 at an angle relative to the plane defined by the bottom side 24 of the bin surface 20. The angle may vary significantly but will generally be between 30° and 60°. The lip 52 may include a plurality of holes 56, 58, and 60 that are configured to mate with the one or more projections 54 to connect the bottom surface 24 with the lip 52.

The holes 56, 58, and 60 may be any one of a number of different shapes. In this example, the holes 56, 58, and 60 are substantially square. As to the number of holes, the number of holes will generally match the number of projections 54 that extend from the bottom side 24 of the bin surface 20. Nevertheless, it should be understood that any number of projections 54 and/or any number of holes may be utilized and they do not need to necessarily match.

The channel 50 may include one or more drainage holes 62 and 64. The drainage holes 62 and 64 may be located at opposing ends 66 and 68 of the channel 50. An apex 70 may be located between the first end 66 and the second end 68. The apex 70 generally has an elevation higher than the drainage holes 62 and 64. As such, liquid entering the channel 50 is guided by gravity away from the apex 70 to either the first drainage hole 62 or the second drainage hole 64.

Fluid entering the drainage holes 62 and/or 64 are then guided to the floor of the cabin which contains a vehicle drainage system 72. The vehicle drainage system 72 receives the fluid provided to the channel 50 and discharges the fluid either to a storage container or to the external environment.

As stated previously, the cup holder portion 38 may be adjacent to the console bin assembly 14. This placement may be strategic as it allows for liquids accidentally spilled from the drinking vessels 45 to fall into the cavity 34 of the console bin assembly 14. The channel 50 can then drain out fluids accidentally spilled into the cavity 34 of the console bin assembly 14.

The console bin assembly 14 may be disposed within the vehicle 12 such that the console bin assembly 14 may be located near several in-vehicle electronic components. For example, as best shown in FIG. 3, the console bin assembly 14 may be located near and an HDMI port 80 that allows for the input or output of video signals. The console bin assembly could also be located by one or more USB ports 82 that may be located proximate to the cavity 34 and allow devices to integrate and connect to one or more vehicle systems or simply allow electronic devices to be charged. Additionally, the console bin assembly 14 may be located above one or more wiring harnesses 84. As such, the draining of fluid spilled within the cavity 34 of the console bin assembly 14 should be drained away by the channel 50 to prevent any electrical malfunctions caused by exposure to liquid.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC). As used herein, the term "substantially" or "about" includes exactly the term it modifies and slight variations therefrom. Thus, the term "substantially perpendicular" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

The recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A console bin assembly, the console bin assembly comprising:
   a bin surface having a perimeter;
   a wall extending upward relative to the bin surface, the wall being adjacent to the perimeter of the bin surface;
   a channel located adjacent to the perimeter of the bin surface and the wall, the channel having a first end and a second end;
   a first drainage hole located near the first end of the channel; and
   the channel being sloped such that liquid entering the channel is guided to the first drainage hole.

2. The console bin assembly of claim 1, further comprising:
   a second drainage hole located near the second end of the channel;
   an apex formed in the channel and located between the first end and the second end of the channel;
   wherein a first portion of the channel between the apex and the first end is sloped such that liquid entering the first portion of the channel is guided to the first drainage hole; and
   wherein a second portion of the channel between the apex and the second end is sloped such that liquid entering the second portion of the channel is guided to the second drainage hole.

3. The console bin assembly of claim 1, wherein a portion of the bin surface extends over a portion of the channel.

4. The console bin assembly of claim 1, wherein the channel is formed from a portion of the wall nearest the perimeter of the bin surface.

5. The console bin assembly of claim 1, further comprising:
   a cup holder having a cup holder surface;
   wherein the wall is located between the cup holder surface and the bin surface; and
   wherein the wall extends from the cup holder surface.

6. The console bin assembly of claim 1,
   wherein the bin surface the wall, and a front portion define a console bin cavity.

7. The console bin assembly of claim 6, further comprising:
   wherein the bin surface has a top side and a bottom side, wherein the top side, the first wall, and a front portion define the console bin cavity; and
   a lip formed on the channel, the lip defining a lip surface configured to engage the bottom side of the bin surface.

8. The console bin assembly of claim 7, further comprising:
   at least one projection formed on the bottom side of the bin surface;
   at least one hole formed on the lip of the channel; and
   wherein the at least one projection is configured to mate with the at least one hole.

9. The console bin assembly of claim 8, wherein:
   a portion of the bin surface extends over a portion of the channel; and
   the channel is formed from a portion of the wall.

* * * * *